J. E. GUINN.
CLUTCH MECHANISM FOR TRAVELING CRANES.
APPLICATION FILED JULY 24, 1915.

1,176,827.

Patented Mar. 28, 1916.

Witnesses

Inventor
J. E. Guinn
by
Attorneys

UNITED STATES PATENT OFFICE.

JAMES E. GUINN, OF SPRINGFIELD, MISSOURI.

CLUTCH MECHANISM FOR TRAVELING CRANES.

1,176,827.  Specification of Letters Patent.  Patented Mar. 28, 1916.

Application filed July 24, 1915. Serial No. 41,734.

*To all whom it may concern:*

Be it known that I, JAMES E. GUINN, a citizen of the United States, residing at Springfield, in the county of Greene and State of Missouri, have invented a new and useful Clutch Mechanism for Traveling Cranes, of which the following is a specification.

The present invention is a clutch mechanism for traveling cranes, and is designed for preventing the carriage or truck of the crane from moving beyond predetermined points of the track or rail, so as to prevent the truck or carriage from accidentally running into obstructions at the ends of the track, and to prevent the truck from running off of the ends of the track.

A salient feature of the invention resides in the provision of a unique clutch mechanism carried by the truck or carriage of the traveling crane, and coöperable with the track or rail upon which the track runs, whereby when the truck reaches predetermined points of the track, the truck will be automatically reversed should the operator fail to stop the truck in time.

It is also within the scope of the invention to provide a clutch mechanism of the nature indicated, which is comparatively simple and inexpensive in construction, which may be readily installed in various traveling cranes and the like, and which is dependable, practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
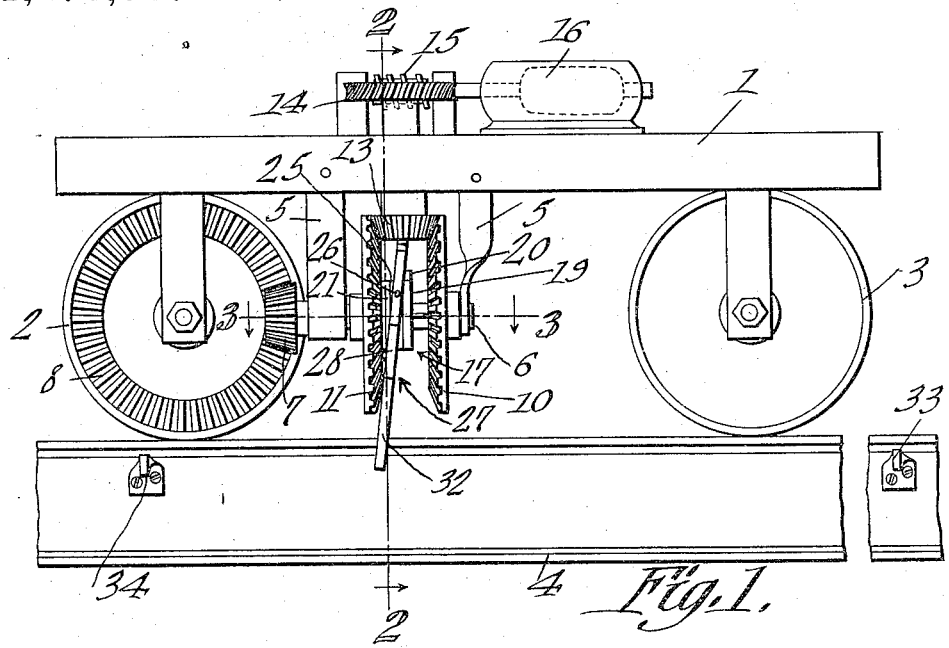
Figures 2, 3:
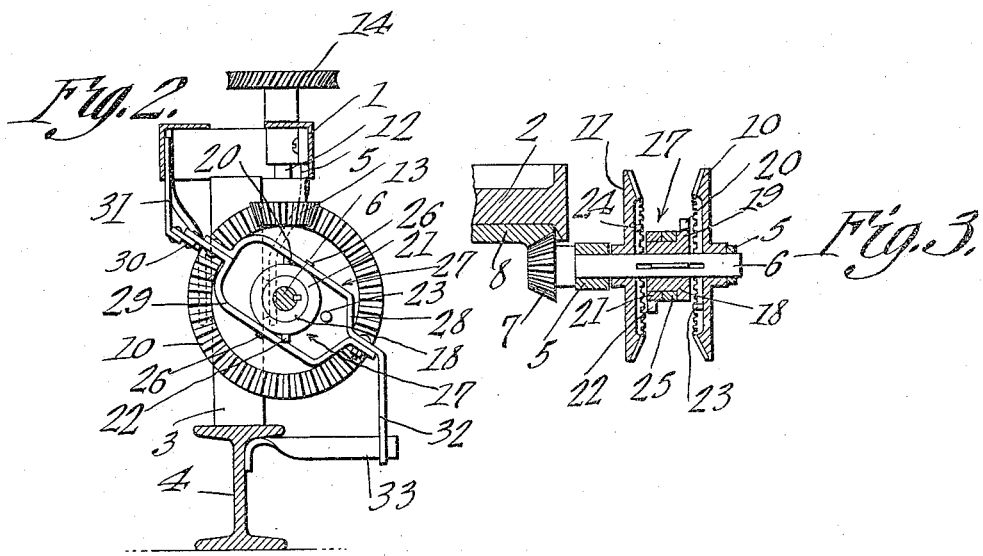

Figure 1 is a fragmental side elevation of the truck of a traveling crane illustrating the present clutch mechanism applied thereto. Fig. 2 is a cross section taken on the line 2—2 of Fig. 1. Fig. 3 is a sectional detail taken on the line 3—3 of Fig. 1.

In the drawing, only a portion of the truck of the traveling crane is illustrated, as this will be sufficient for enabling the merits of the present invention to be properly understood by those versed in the art.

The frame of the truck is designated by the numeral 1, the same being supported by wheels 2 and 3 which run upon a track or rail 4, but it is evident at this point that the frame 1 may employ any number of supporting wheels to travel upon one or more rails.

In carrying out the invention, a pair of hangers 5 are hung from the frame 1 between the wheels 2 and 3, and a horizontal longitudinal shaft 6 is journaled through the lower ends or bearings of the hangers 5, and has a beveled pinion 7 keyed upon one end and intermeshing with a bevel gear 8 secured to one side of the driving wheel 2 of the truck or carriage. A pair of opposed bevel gears 10 and 11 are journaled loosely upon the shaft 6 between the hangers 5, and a vertical upright shaft 12 which is journaled through the frame 1 has a bevel pinion 13 keyed upon its lower end and disposed between and intermeshing with the upper portions of the gears 10 and 11, whereby when the shaft 12 is rotated, the gears 10 and 11 will be rotated in opposite directions. The gears 10 and 11 are considerably larger than the gear 13, whereby the gears 10 and 11 will be rotated at a slower velocity than the shaft 12, and the gear 8 is considerably larger than the pinion 7, whereby the wheel 2 will be rotated slower than the gears 10 and 11. In this manner, a proper gear ratio is attained for moving the truck 1 at the proper speed along the rails.

A worm wheel 14 is keyed to the upper end of the shaft 12 and intermeshes with a worm 15 which is actuated by an electric motor or other prime mover 16 mounted upon the frame 1, so that the shaft 12 will be rotated at a much slower velocity than the armature shaft of the motor. The motor 16 may be supplied with current in the ordinary manner, which needs no detailed description or illustration.

A clutch device 17 is located upon the shaft 6 between the gears 10 and 11 and is employed for operatively connecting one or the other of said gears and said shaft. This clutch device 17 embodies a sleeve or hub 18 feathered upon the shaft 6 between the gears 10 and 11, and having an outturned annular flange 19 adjacent the gear 10, said flange 19 having an outstanding finger 20. A collar 21 is engaged rigidly upon the other end of the sleeve 18 and is provided with an outstanding finger 22. The gears 10 and 11 are provided with the inwardly projecting lugs or studs 23 and 24, respectively, which are coöperable with the respective fingers 20 and 22. Thus, each of the gears 10 and 11 is provided with a single lug for the engagement of a single finger of the clutch device.

A collar 25 is mounted loosely upon the sleeve 18 between the flange 19 and collar 21, and is provided with diametrically opposite trunnions 26 engaging the yoke of a lever 27. This lever 27 comprises two bars 28 and 29 which are secured together and which have their intermediate portions separated to provide the yoke which passes around the clutch device. One end of the bar 29 is extended beyond the yoke and is pivoted, as at 30, to a hanger or bracket 31 depending from the frame 1, and one end of the bar 28 is extended downwardly to provide a tappet 32 coöperable with a pair of outstanding stops or arms 33 and 34 carried by one side of the rail 4. The lever 27 is arranged obliquely or diagonally, although it may be disposed in any other position, and the upper end of the lever 27 is pivoted or fulcrumed to the frame 1, while the lower end of the lever has the tappet 32 which is disposed between the stops 33 and 34 at one side of the rail 4. The stops 33 and 34 are located at proper points, to prevent the truck from running completely to the ends of the rail 4.

Supposing the truck is traveling from the right hand side to the left hand side, as viewed in Fig. 1, with the lever 27 thrown toward the left whereby the truck will move in the said direction, should the operator fail to stop the truck when it approaches the left hand end of the rail 4, the tappet 32 will engage the left hand stop 34, and this will swing the lever 27 away from the gear 11, and the gear 11 will thus be disconnected from the shaft 6 and the power being removed from the wheel 2, will itself tend to stop the truck, but due to the further movements of the truck, the lever 27 will be swung toward the gear 10 to cause the clutch device or member 17 to engage the gear 10. This will reverse the movement of the truck gradually so that the truck will now move toward the right hand end of the rail, to prevent an accident, and to call the operator's attention to the fact. When the lever 27 is moved toward the gear 11, the finger 22 will engage the lug 24 whereby the shaft 6 will be rotated with the gear 11, and when the lever 27 is moved adjacent the gear 10, the lug 23 of the gear 10 will engage the finger 20 of the clutch device, for rotating the shaft 6 with the gear 10. Consequently, when the lever 27 is swung to opposite positions, the shaft 6 and wheel 2 will be rotated in opposite directions, for reversing the truck. When the lever 27 is swung adjacent the gear 10, the truck will move from the left hand side to the right hand side, as seen in Fig. 1, and the tappet 32 will then strike the stop 33, upon the excessive movement of the truck toward the right, which would cause the clutch device 17 to be automatically thrown out of engagement from the gear 10 and into engagement with the gear 11 for again reversing the movement of the truck.

Having thus described the invention, what is claimed as new is:

1. In a mechanism of the character described, a rail, a truck movable along the rail and having a propelling wheel engaging the same, a longitudinal shaft carried by the truck and operatively connected to said wheel, a pair of members mounted loosely upon said shaft, a prime mover carried by the truck and operatively connected to said members for rotating them in opposite directions, a clutch device feathered upon said shaft between said members, the clutch device and said members having interengageable means, a lever fulcrumed to the truck for operating the clutch device, and stops carried by the rail in the path of said lever for swinging the lever when the truck reaches predetermined points of the rail.

2. In a mechanism of the character described, a rail, a truck movable therealong and having a propelling wheel engaging said rail, a longitudinal shaft carried by the truck, a pinion carried by said shaft, a gear carried by said wheel and intermeshing with said pinion, a pair of gears mounted loosely upon said shaft, a prime mover carried by the truck, a pinion operatively connected to said prime mover and disposed between and intermeshing with said pair of gears, a clutch device feathered upon said shaft between said pair of gears, said pair of gears and clutch device having interengageable means, a lever fulcrumed to the truck for operating the clutch device, and outstanding stops carried by the rail in the path of said levers.

In testimony that I claim the foregoing as my own, I have hereto affixed my signature in the presence of two witnesses.

JAMES E. GUINN.

Witnesses:
S. H. VIENHAGE,
C. G. WITTY.

Copies of this patent may be obtained for five cents each, by addressing the "Commissioner of Patents, Washington, D. C."